(12) United States Patent
Vellanki et al.

(10) Patent No.: US 11,708,087 B2
(45) Date of Patent: Jul. 25, 2023

(54) NO-BLOCK ZONE COSTS IN SPACE AND TIME FOR AUTONOMOUS VEHICLES

(71) Applicant: Waymo LLC, Mountain View, CA (US)

(72) Inventors: Ram Vellanki, Kendall Park, NJ (US); Cheng Zhou, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 168 days.

(21) Appl. No.: 17/382,449

(22) Filed: Jul. 22, 2021

(65) Prior Publication Data

US 2023/0036720 A1 Feb. 2, 2023

(51) Int. Cl.
*B60W 60/00* (2020.01)
*G01C 21/34* (2006.01)

(52) U.S. Cl.
CPC ......... *B60W 60/00* (2020.02); *G01C 21/3461* (2013.01)

(58) Field of Classification Search
CPC ......... G05D 2201/0213; G05D 1/0088; G05D 1/0214; G05D 1/0212; B60W 60/0011; B60W 2554/00; B60W 2554/20; G01C 21/3461; G01C 21/3453
See application file for complete search history.

(56) References Cited

U.S. PATENT DOCUMENTS

| | | |
|---|---|---|
| 10,202,118 B2 | 2/2019 | Russell et al. |
| 2018/0180429 A1 | 6/2018 | De Lorenzo et al. |
| 2019/0120640 A1 * | 4/2019 | Ho ..................... G01C 21/3461 |
| 2021/0114617 A1 | 4/2021 | Phillips et al. |
| 2021/0122373 A1 | 4/2021 | Dax |
| 2021/0362743 A1 * | 11/2021 | Zhu ....................... B60W 30/09 |

* cited by examiner

*Primary Examiner* — Adam R Mott
*Assistant Examiner* — Erick T. Detweiler
(74) *Attorney, Agent, or Firm* — Botos Churchill IP Law

(57) ABSTRACT

Aspects of the disclosure provide for controlling an autonomous vehicle using no block costs in space and time. For instance, a trajectory for the autonomous vehicle to traverse in order to follow a route to a destination may be generated. A set of no-block zones through which the trajectory traverses may be identified. A no-block zone may be region where the autonomous vehicle should not stop but can drive through in an autonomous driving mode. For each given no-block zone of the set, a penetration cost that increases towards a center of the no-block zone and decreases towards edges of the no-block zone may be determined. Whether the autonomous vehicle should follow the trajectory may be determined based on the penetration cost. An autonomous vehicle may be controlled in the autonomous driving mode according to the trajectory based on the determination of whether the autonomous vehicle should follow the trajectory.

20 Claims, 8 Drawing Sheets

NO-BLOCK ZONE COSTS IN SPACE AND TIME FOR AUTONOMOUS VEHICLES

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be largely dependent on systems that are capable of determining the location of the autonomous vehicle at any given time, as well as detecting and identifying objects external to the vehicle, such as other vehicles, stop lights, pedestrians, etc.

BRIEF SUMMARY

Aspects of the disclosure provide a method controlling an autonomous vehicle. The method includes generating, by one or more processors, a trajectory for the autonomous vehicle to traverse in order to follow a route to a destination; identifying, by the one or more processors, a set of no-block zones through which the trajectory traverses, wherein a no-block zone is region where the autonomous vehicle should not stop but can drive through in an autonomous driving mode; for each given no-block zone of the set, determining, by the one or more processors, a penetration cost such that the penetration cost increases towards a center of that given no-block zone and decreases towards edges of that given no-block zone; determining, by the one or more processors, whether the autonomous vehicle should follow the trajectory based on the penetration cost; and controlling, by the one or more processors, the autonomous vehicle in the autonomous driving mode according to the trajectory based on the determination of whether the autonomous vehicle should follow the trajectory.

In one example, the penetration cost is determined further based on a type of the given no-block zone. In another example, the method also includes aggregating the penetration costs for each no-block zone of the set, and wherein determining whether the autonomous vehicle should follow the trajectory is further based on the aggregated penetration costs. In another example, the method also includes generating a second trajectory the autonomous vehicle to traverse in order to follow the route; identifying a second set of no-block zones through which the second trajectory traverses; and for each given no-block zone of the second set, determining a second penetration cost such that the second penetration cost increases towards a center of that given no-block zone of the second set and decreases towards edges of that given no-block zone of the second set, and determining whether the autonomous vehicle should follow the trajectory is further based on the second penetration cost. In this example, determining whether the autonomous vehicle should follow the trajectory further includes comparing the penetration cost to the second penetration cost. In addition or alternatively, the method also includes aggregating the penetration costs for each no-block zone of the set; and aggregating the second penetration costs for each no-block zone of the second set, and determining whether the autonomous vehicle should follow the trajectory further includes comparing the aggregated penetration costs and the aggregated second penetration costs.

In another example, the trajectory includes the autonomous vehicle traversing one or more edges of a road graph, and the method also includes determining a second cost for the trajectory based on the penetration cost and an expected speed of the autonomous vehicle while traversing an edge of the trajectory according to the trajectory. In this example, the edge passes through at least one no-block region of the set, and wherein determining whether the autonomous vehicle should follow the trajectory is further based on the second cost. In addition, determining the second cost for the trajectory is further based on an expected amount of time for the autonomous vehicle to traverse the edge. In addition, traversing the edge involves the vehicle entering and completely exiting the edge. In addition or alternatively, determining the second cost for the trajectory is further based on whether the expected speed of the autonomous vehicle while traversing the edge is greater than a threshold value. In this example, the method also includes determining the threshold value based on a type of the no-block region through which the edge passes. In another example, the trajectory includes the autonomous vehicle traversing one or more edges of a road graph, and the method also includes determining a second cost for the trajectory based on the penetration cost and an expected amount of time that the autonomous vehicle would be stopped at the start of an edge according to the trajectory.

Another aspect of the disclosure provides a system for controlling an autonomous vehicle. The system includes one or more processors configured to generate a trajectory for the autonomous vehicle to traverse in order to follow a route to a destination; identify a set of no-block zones through which the trajectory traverses, wherein a no-block zone is region where the autonomous vehicle should not stop but can drive through in an autonomous driving mode; for each given no-block zone of the set, determine a penetration cost such that the penetration cost increases towards a center of that given no-block zone and decreases towards edges of that given no-block zone; determine whether the autonomous vehicle should follow the trajectory based on the penetration cost; and control the autonomous vehicle in the autonomous driving mode according to the trajectory based on the determination of whether the autonomous vehicle should follow the trajectory.

In this example, the penetration cost is determined further based on a type of the given no-block zone. In another example, the one or more processors are further configured to aggregate the penetration costs for each no-block zone of the set, and wherein the determining whether the autonomous vehicle should follow the trajectory is further based on the aggregated penetration costs. In another example, the one or more processors are further configured to generate a second trajectory the autonomous vehicle to traverse in order to follow the route; identify a second set of no-block zones through which the second trajectory traverses; and for each given no-block zone of the second set, determine a second penetration cost such that the second penetration cost increases towards a center of that given no-block zone of the second set and decreases towards edges of that given no-block zone of the second set. In addition, determining whether the autonomous vehicle should follow the trajectory is further based on the second penetration cost. In another example, the trajectory includes the autonomous vehicle traversing one or more edges of a road graph, and the the one or more processors are further configured to determine a second cost for the trajectory based on the penetration cost and an expected speed of the autonomous vehicle while traversing an edge of the trajectory according to the trajectory. In addition, the edge passes through at least one no-block region of the set, and determining whether the autonomous vehicle should follow the trajectory is further based on the second cost. In this example, the one or more processors are further configured to determine the second cost for the trajectory further based on an expected amount of time for the autonomous vehicle to traverse the edge. In addition or alternatively, the one or more processors are further configured to determine the second cost for the trajectory further based on whether the expected speed of the autonomous vehicle while traversing the edge is greater than a threshold value. In another example, the trajectory includes the autonomous vehicle traversing one or more edges of a road graph, and the one or more processors are further configured to determine a second cost for the trajectory based on the penetration cost and an expected amount of time that the autonomous vehicle would be stopped at the start of an edge according to the trajectory.

DETAILED DESCRIPTION

Overview

Figure 1:
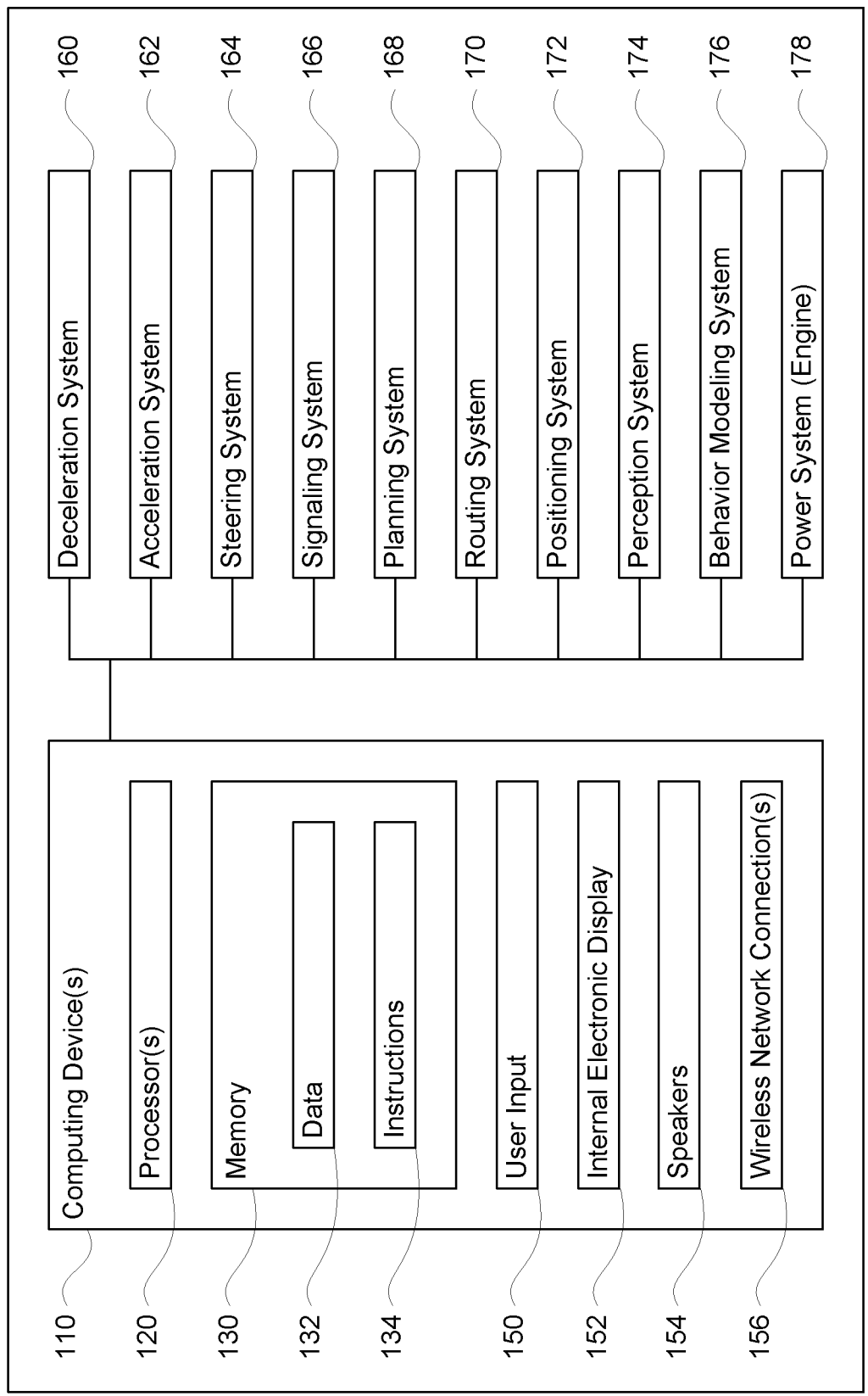
FIG. 1 is a functional diagram of an example vehicle in accordance with an exemplary embodiment.

The technology relates to controlling autonomous vehicles in order to avoid stopping or moving too slowly through certain types of areas. For instance, there are certain "no-block zones" areas within which a vehicle should avoid stopping such as railroad crossings, crosswalks, intersections, across a lane of traffic, and regions specifically designated as no stopping zones (areas designated by "Don't Block the Box" or "Keep Clear" signs or indicators). Each no-block zone may be defined in map information used by such autonomous vehicles, for instance, as a line having a pair of end points or a polygon having three or more edges. Current approaches for avoiding such no-block zones may involve autonomous vehicles making a binary "yes" or "no" determination for violating (e.g. entering into) a no block zone therefore causing such vehicles to stop the vehicle using a hard braking maneuver, increase the vehicle's speed to avoid the no block zone, or potentially ignoring the no block zone and stopping within it. However, it may not always be possible to stop outside of such no-block and moreover, it may be more dangerous to stop the vehicle using a hard braking maneuver or increase the vehicle's speed to avoid a no-block zone than to stop a few inches within the no-block zone.

The vehicle's computing devices may utilize pre-stored map information in order to control the vehicle within a driving environment. The map information may be configured as a roadgraph which includes a plurality of graph nodes and edges representing road or lane segments that together make up the road network of the map information. Each edge is defined by a starting graph node having a specific geographic location, an ending graph node having a specific geographic location, and a direction. This direction may refer to a direction the autonomous vehicle 100 must be moving in in order to follow the edge.

The pre-stored map information may thus include highly detailed maps of a vehicle's expected environment as well as information identifying the shape and location of the no-block zones. Alternatively, some no-block zones may be detected in real time, by detecting signs or indicators (such as keep clear markings on a roadway which allow vehicles from minor roadways or driveways to make a turn onto another roadway) or right-of-way and determining that these signs and indicators and right-of-way correspond to additional no-block zones.

In addition to pre-stored map information, the computing devices may rely on information detected by the vehicle's perception system. For instance, the vehicle's sensors may detect and identify various objects in the vehicle's environment as well as information such as location, speed, orientation, status, etc.

As the vehicle is maneuvered along a route to a destination, the computing devices may combine the map information, information from the perception system, and a route the vehicle is currently following as well as other systems of the vehicle to generate trajectories for the vehicle to follow into the future. The trajectories may provide the vehicle with instructions for traversing a portion of the route over some brief period of time into the future, and may also include a plan to stop the vehicle, for instance, in the event a next trajectory is not generated or received by the vehicle's acceleration, deceleration or steering systems.

These trajectories may be evaluated to select the trajectory having the lowest cost. Each time a trajectory is generated, a set of no-block zones through which the trajectory passes may be identified. In some instances, the set may be empty, and in others the set may include a plurality of no-block zones. Thus, at least some of these costs may relate to the trajectory's relationship with any no-block zones of the set. For instance, trajectories may be penalized based on the type or priority of the no-block zone, an amount of penetration into the no-block zone, and the vehicle's expected speed through the no-block zone. For instance, no-block zones may be prioritized based on type. This information may also be stored in the detailed map information associated with each no-block zone or elsewhere.

A penetration cost for each no-block zone may be determined based on both the no-block zone type and the amount of penetration within the zone or how close the autonomous vehicle is to the edges of a no-block zone. For instance, the cost may increase towards the center of the no-block zone and therefore be lower towards the edges or starting and ending points of the no-block zone. Where the set includes multiple no-block zones, the penetration costs of the different no-block zones may be summed together. This aggregated cost may then be combined with other costs in order to assess the overall cost of the trajectory and compare to other trajectories.

In some instances, the speed of the autonomous vehicle may also be used to assess a cost for the autonomous vehicle passing through a no-block zone. In this regard, the trajectory may be divided into a plurality of nodes and edges between pairs of nodes], and a cost may be assessed for each edge. The costs of the individual edges may be summed together. This aggregated cost may then be combined with other costs in order to assess the overall cost of the trajectory and compared to other trajectories. In some instances, the penetration cost may be combined with speed characteristics of the trajectory in order to determine a cost for an edge that traverses a no-block zone. Alternatively, rather than separately assessing the components of cost based on the time the autonomous vehicle will be stopped and the time the autonomous vehicle will be below a certain threshold speed, a single smooth function, inversely correlated with speed may be used to capture both contributions to cost. In some instances, the cost of an edge may also take into account the hysteresis or the historical cost of an edge. This may be used to incentivize (e.g. lower the relative cost of) exiting a no-block zone more and more over time (across iterations).

The features described herein may allow autonomous vehicles to avoid stopping or moving too slowly through no-block zones. In addition, the cost assessments described above may reduce the likelihood of an autonomous vehicle stopping within a no-block zone closer to the center of the no-block zone. As such, the vehicle may be more likely to stop closer to edges of the no block-zone rather than making unsafe maneuvers in order to avoid stopping within a no-block zone. In addition, because the features described herein penalize slower speeds through no-block zones, this may also cause autonomous vehicles to clear no-block regions even faster.

Example Systems

As shown in FIG. 1, an autonomous vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the autonomous vehicle 100 and may be capable of communicating with various components of the vehicle in order to control the vehicle in an autonomous driving mode. For example, returning to FIG. 1, the computing devices 110 may be in communication with various systems of autonomous vehicle 100, such as deceleration system 160, acceleration system 162, steering system 164, signaling system 166, planning system 168, routing system 170, positioning system 172, perception system 174, behavior prediction system 176, and power system 178 in order to control the movement, speed, etc. of autonomous vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing devices 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
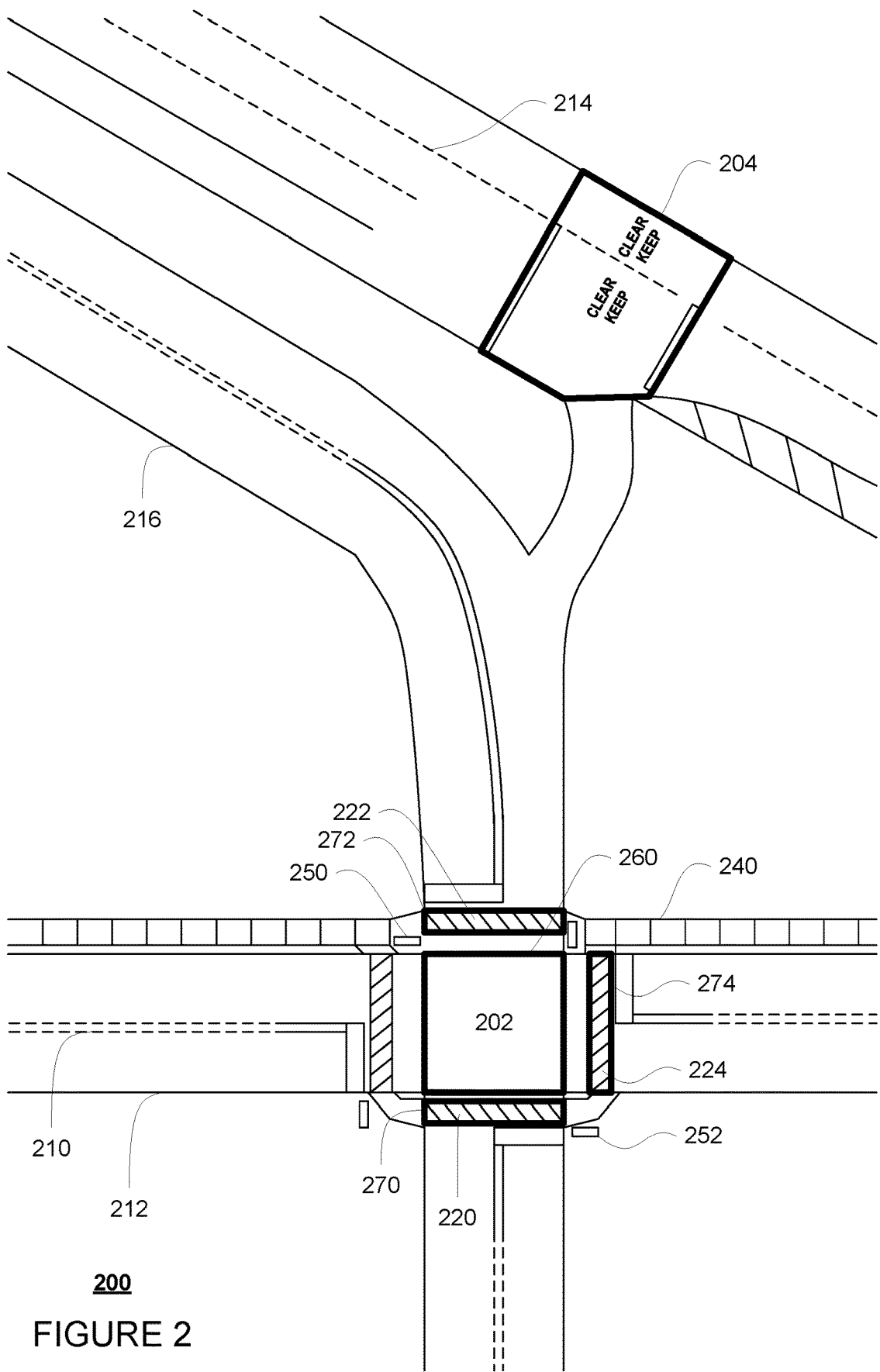
FIG. 2 is an example representation of map information in accordance with aspects of the disclosure.

FIG. 2 is an example of map information 200 for a section of roadway including intersection 202 and keep clear area identified by polygon 204. In this example, the map information 200 includes information identifying the shape, location, and other characteristics of road features such as lane lines 210, 212, 214, 216, crosswalks 220, 222, 224, sidewalks 240, and stop signs 250, 252.

In addition to the aforementioned road features, the map information may identify no-block zones and associated types. These features may define areas where the vehicle 100 is able to drive through, but at which the vehicle should not stop. Each no-block zone may be defined in the map information as a polygon having three or more edges with an associated type. For instance, intersection 202 may be associated with a no-block zone identified by the polygon 260 which corresponds to the shape of intersection 202. In this regard, the polygon 260 may be associated with the no-block zone type "intersection". Crosswalks 220, 222, and 224 may each be associated with a no-block zone identified by polygons 270, 272, 274, respectively, corresponding to the rectangular shape of each crosswalk and thus, also associated with the no-block zone type of "crosswalk". As noted above, a keep clear area is identified by polygon 204 which may be associated with a no-block zone type of "keep clear area". Other no-block zones may be identified based on the route that the vehicle is following, such as where the vehicle crosses over a lane of traffic to reach another lane of traffic (see the discussion below regarding FIGS. 8A and 8B). Alternatively, some regions may be detected in real time, by detecting signs or indicators (such as markings on a roadway) and determining that these signs and indicators correspond to additional no-block zones.

Figure 6:
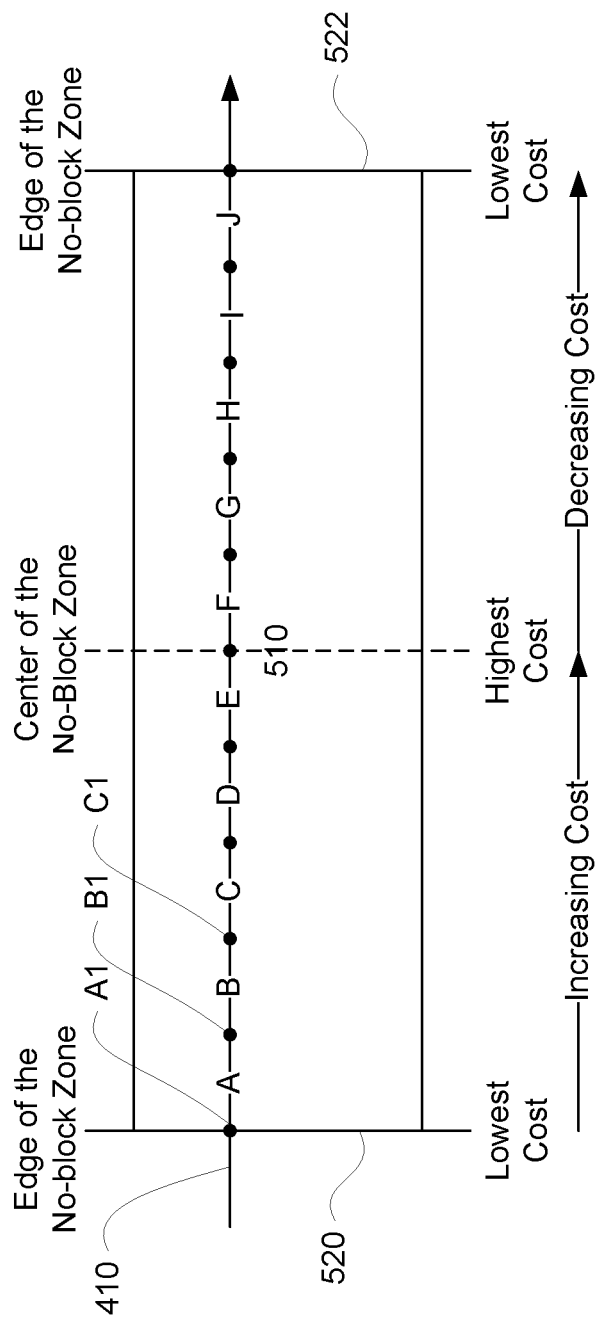
FIG. 6 is an example representation of a no-block zone and edges in accordance with aspects of the disclosure.

In some instances, no-block zones may be associated with even more detailed information about their configuration. For instance, a polygon 204 may represent a "Keep Clear" area in the map information 200. However, referring to FIG. 6, depicting a bird's eye view of the section of roadway corresponding to the map information 200, the orientation of the text as well as the painted stop lines show the intent that a vehicle at point A moving towards point B should not block the keep clear area if other vehicles ahead come to a stop, but a second vehicle moving from point C to point D and into the keep clear area does not need to observe this restriction as vehicles such as the second vehicle are the reason that the "Keep Clear" area exists at all. In this regard, the polygon 204 may be associated with information identify the direction of traffic that needs to observe the keep clear area identified by polygon 204 and the direction of traffic that does not need to observe the keep clear area identified by polygon 204.

In some instances, no-block zones may be prioritized based on type. In other words, each no-block zone of the map information may be associated with a type. Of course, some types, such as active crosswalks and inactive crosswalks may be determined in real time based on both information from the map information (identifying a keep clear area polygon as a crosswalk) and information from the perception system (identifying whether there is a pedestrian in or proximate to the crosswalk) in order to differentiate between an active polygon and an inactive one (such as an active crosswalk and an inactive crosswalk). In this regard, an active crosswalk may include a crosswalk included in the map information and where information from the perception system 174 indicates to the computing devices 110 that there are pedestrians, pedestrians within a short distance of the crosswalk, or pedestrians exhibiting some behavior that would indicate that the pedestrians will enter the crosswalk such as approaching the crosswalk from a given distance. Similarly, an inactive crosswalk may include a crosswalk included in the map information and where information from the perception system 174 indicates to the computing devices 110 that there are no pedestrians in or within a short distance of the crosswalk.

Data 132 may also store a table or other organizational scheme that relates the types with a priority value identifying that type of no-block zone's importance or priority relative to the other types of no-block zones. Table 1 is an example of priority values for different types of no-block zones, here shown with a range from 0.1-0.7. Of course different values and/or scales may also be used.

TABLE 1

| No-Block Zone Type | Priority Value |
| --- | --- |
| Railroad crossing | 0.7 |
| Active crosswalk | 0.6 |
| Intersection | 0.5 |
| Across a lane of traffic | 0.4 |
| Posted "Keep Clear" area | 0.3 |
| Posted "Don't Block the Box" area | 0.2 |
| Inactive crosswalk | 0.1 |

For instance, no-block zones corresponding to railroad crossings may have a higher priority than no-block zones corresponding to active crosswalks (where there are pedestrians, pedestrians within a short distance, or pedestrians exhibiting some behavior that would indicate that the pedestrians will enter the crosswalk). Active crosswalks may have a higher priority than across a lane of traffic, across a lane of traffic may have a higher priority than posted "keep Clear" or "Don't Block the Box" areas, and inactive crosswalks may have a lowest priority of all. This information may also be stored in the detailed map information associated with each no-block zone or elsewhere (e.g. a lookup table).

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic or traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/ speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include LIDARs, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
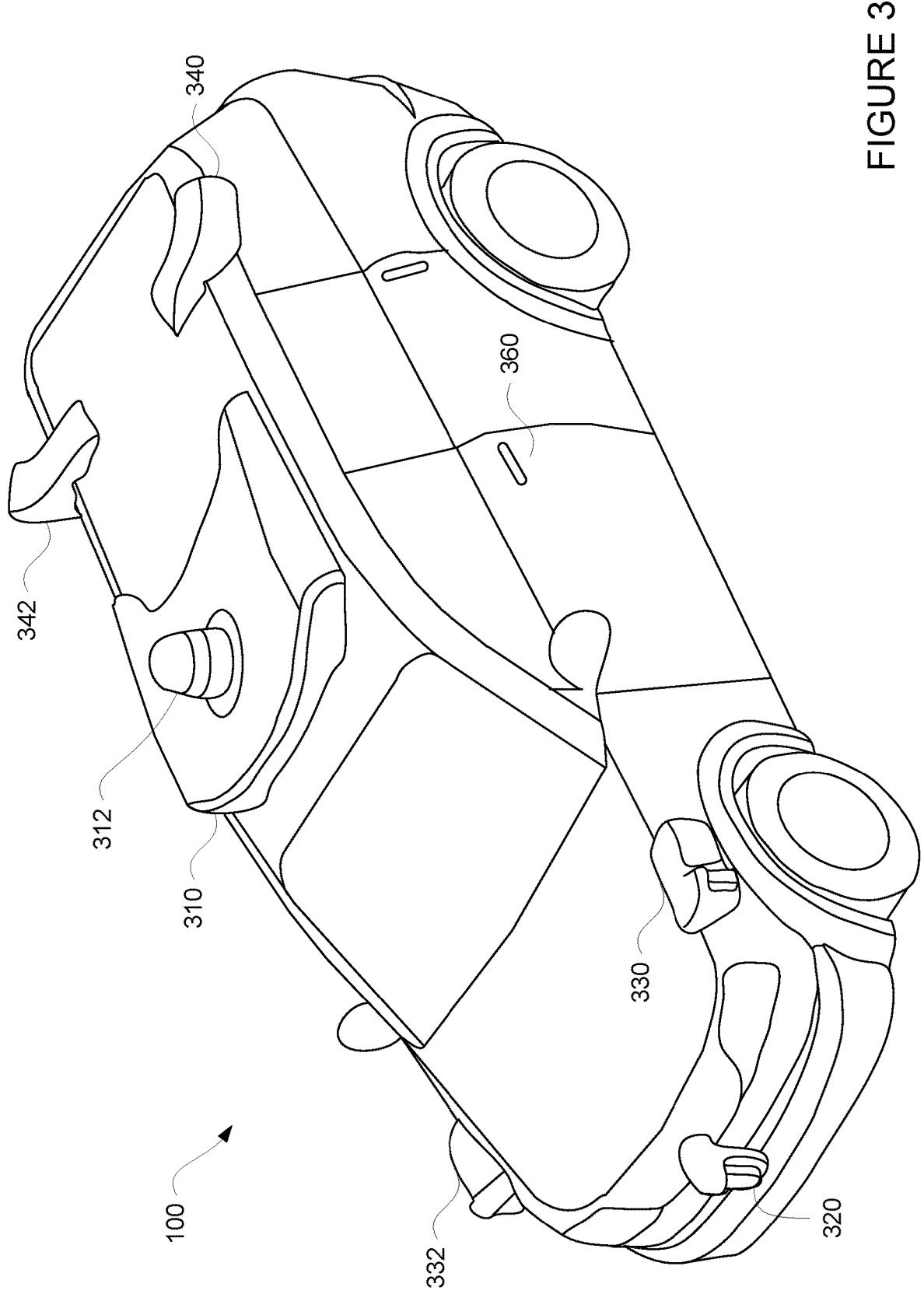
FIG. 3 is an example external view of a vehicle in accordance with aspects of the disclosure.

For instance, FIG. 3 is an example external view of autonomous vehicle 100. In this example, roof-top housing 310 and dome housing 312 may include a LIDAR sensor as well as various cameras and radar units. In addition, housing 320 located at the front end of autonomous vehicle 100 and housings 330, 332 on the driver's and passenger's sides of the vehicle may each store a LIDAR sensor. For example, housing 330 is located in front of driver door 360. Autonomous vehicle 100 also includes housings 340, 342 for radar units and/or cameras also located on the roof of autonomous vehicle 100. Additional radar units and cameras (not shown) may be located at the front and rear ends of autonomous vehicle 100 and/or on other positions along the roof or roof-top housing 310.

The computing devices 110 may be capable of communicating with various components of the vehicle in order to control the movement of autonomous vehicle 100 according to primary vehicle control code of memory of the computing devices 110. For example, returning to FIG. 1, the computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior prediction system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior prediction system 176 which uses various behavior prediction models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing devices 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
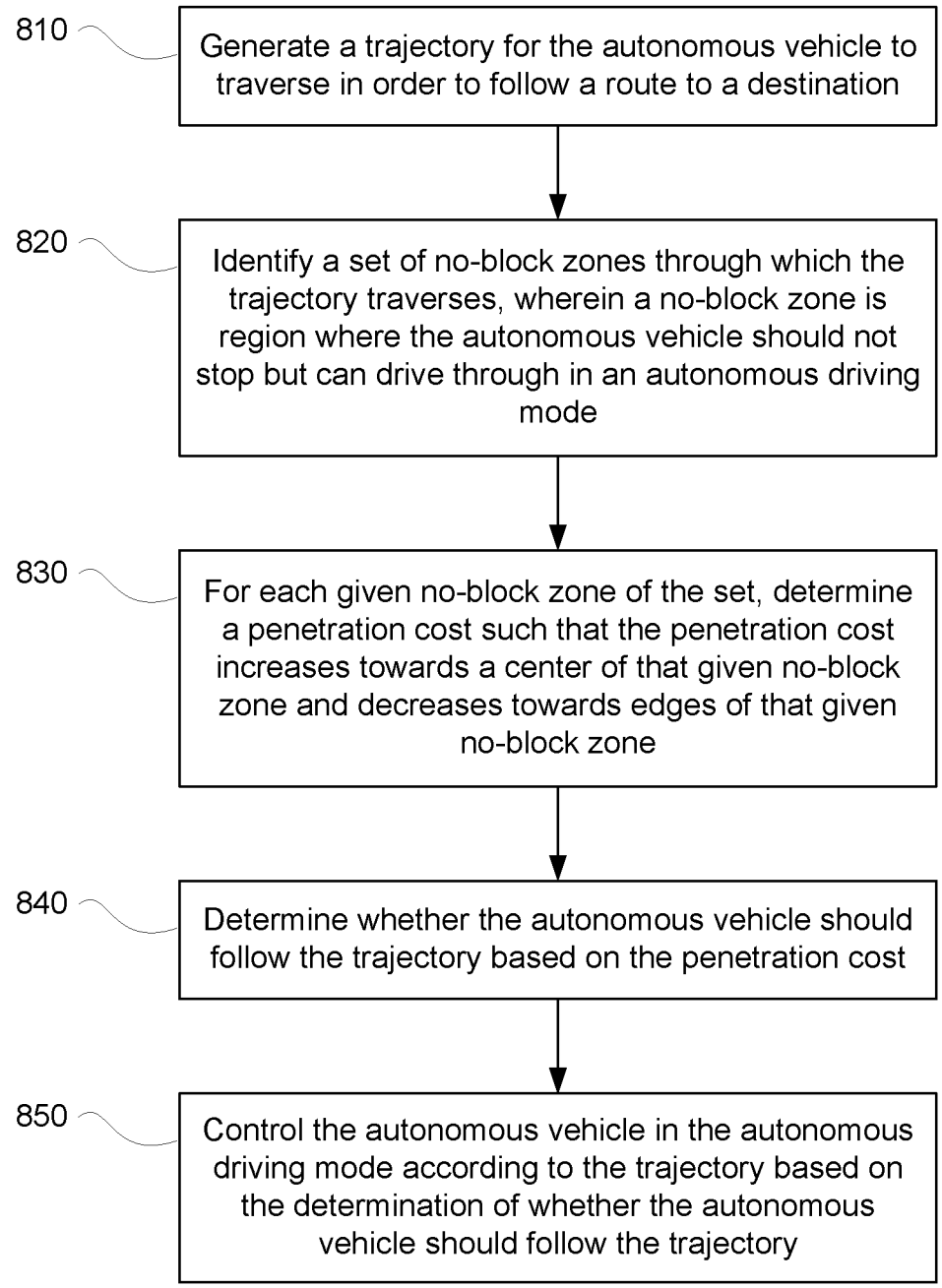
FIG. 8 is an example flow diagram in accordance with aspects of the disclosure.

FIG. 8 is an example flow diagram 800 for controlling an autonomous vehicle, which may be performed by one or more processors of one or more computing devices, such as the processors 120 of the computing devices 110 and/or other processors of the various other systems of the vehicle 100 discussed above. At block 810, a trajectory for the autonomous vehicle to traverse in order to follow a route to a destination is generated.

As the vehicle is maneuvered along a route to a destination, the computing devices may combine the map information, information from the perception system, and a route the vehicle is currently following as well as other systems of the vehicle to generate trajectories for the vehicle to follow into the future. For instance, the routing system 170 may determine a route between the vehicle's current location and a destination location. This route may be used as a baseline for the planning system 168 to generate trajectories. In this regard, the trajectories may provide the vehicle with instructions for traversing a portion of the route over some brief period of time into the future, such as 10 seconds or more or less, and may also include a plan to stop the vehicle, for instance, in the event a next trajectory is not generated or received by the vehicle's acceleration, deceleration or steering systems. In this regard, the trajectory may include a geometry component (where the vehicle is to drive) and a speed component (how to control the acceleration and deceleration of the vehicle in order to achieve desired speeds).

Figure 4:
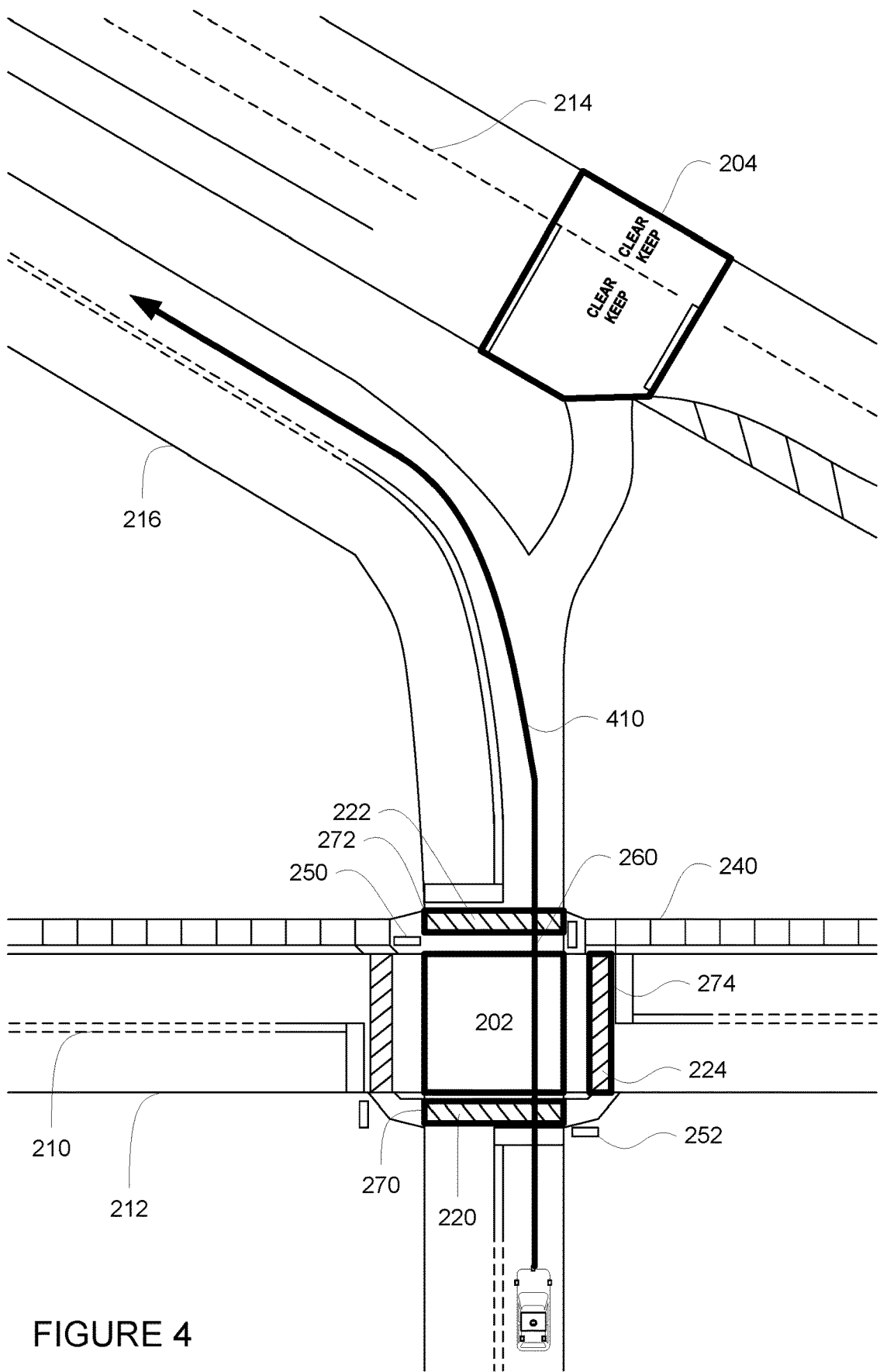
FIG. 4 is an example representation of map information and a trajectory in accordance with aspects of the disclosure.

FIG. 4 is an example representation of the map information 200 depicting a current location of the autonomous vehicle 100. In this example, the planning system has generated a trajectory 410 which passes through intersection 202 and maneuvers the vehicle towards a destination (not shown) according to a route generated by the routing system (not shown).

Returning to FIG. 8, at block 820, a set of no-block zones through which the trajectory traverses is identified. In this example, a no-block zone is region where the autonomous vehicle should not stop but can drive through in an autonomous driving mode. Each time a trajectory is generated, a set of no-block zones through which the trajectory passes may be identified. In some instances, the set may be empty, and in others the set may include a plurality of no-block zones. Thus, at least some of these costs may relate to the trajectory's relationship with any no-block zones of the set. For instance, trajectories may be penalized based on the type or priority of the no-block zone (as described above), an amount of penetration into the no-block zone, and the vehicle's expected speed through the no-block zone.

Returning to the example of FIG. 4, the trajectory 410 includes the autonomous vehicle passing through no-block zones including the intersection polygon 202, polygon 270, and polygon 272.

Returning to FIG. 8, at block 830, for each given no-block zone of the set, a penetration cost is determined such that the penetration cost increases towards a center of that given no-block zone and decreases towards edges of that given no-block zone. A penetration cost for each no-block zone may be determined based on both the no-block zone type and the amount of penetration within the zone or how close the autonomous vehicle is to the edges of a no-block zone. As such, returning to the example of FIG. 4, a penetration cost may be determined for each of the no-block zones including polygon 260, polygon 270, and polygon 272.

Figure 5:
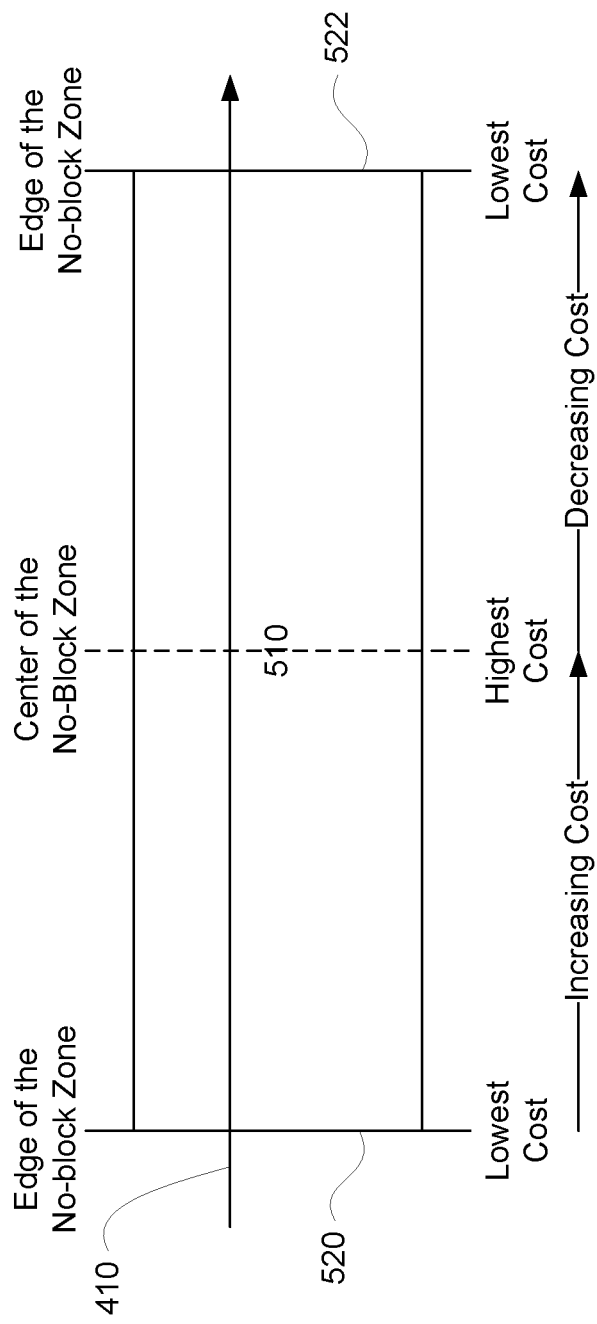
FIG. 5 is an example representation of a no-block zone and data in accordance with aspects of the disclosure.

For instance, the penetration cost may increase towards the center of the no-block zone and therefore be lower towards the edges or starting and ending points of the no-block zone. For example, turning to FIG. 5, a no-block zone which may correspond to any of polygon 260, polygon 270, and polygon 272, is depicted. As can be seen, the costs at the initial edge (the first edge through which the autonomous vehicle 100 would pass) of the no block zone 520 is lowest and then increases and is highest at the center of the no-block zone 510. Thereafter, the cost decreases towards the ending edge 522 (the second edge through which the autonomous vehicle 100 would pass) of the no-block zone 510 and is again at the lowest cost at the ending edge 522.

In this regard, the penetration cost for each no-block zone may be determined using the following equation:

$$C_{penetration}(state) = \text{cost-weight}(type) * \min(\text{dist}(state, entrance), \text{dist}(state, exit))$$

In this example, the penetration cost of a no block zone ($C_{penetration}$) for a given location (state) is based on both the type of the zone (type) as well as the minimum of the distances between the location and the beginning of the no-block zone (entrance) and the end of the no-block zone (exit). The cost-weight is component of the cost based on the type of the zone. For instance, cost weights for being within a railroad crossing may be higher overall than costs of being within an intersection. Thus, the value of cost-weight may be higher for a crosswalk than an intersection. The entrance and exit locations may refer to the points at which the geometry of the trajectory and/or connected edges of a road graph would have the autonomous vehicle enter or exit the no-block zone. Where the set includes multiple no-block zones, the penetration costs of the different no-block zones may be summed together. This aggregated cost may then be combined with other costs in order to assess the overall cost of the trajectory and compare to other trajectories.

Returning to FIG. 8, at block 840, whether the autonomous vehicle should follow the trajectory based on the penetration cost is determined. As noted above, these trajectories may be evaluated to select the trajectory having the lowest cost. In this regard, the penetration cost may be combined with other costs as discussed above in order to determine an overall cost for each determined trajectory. The planning system may then select the trajectory with the lowest overall cost and thereby cause the autonomous vehicle 100 to be controlled according to the selected trajectory.

Returning to FIG. 8, at block 850 the autonomous vehicle is controlled in the autonomous driving mode according to the trajectory based on the determination of whether the autonomous vehicle should follow the trajectory. For instance, as noted above, the computing devices 110 may control the various systems of the autonomous vehicle 100 in order to cause the autonomous vehicle to follow the trajectory towards the destination.

The example above assesses cost of a no-block zone based on location. However, the speed of the autonomous vehicle may also be used to assess a cost for the autonomous vehicle passing through a no-block zone. In this regard, the entire trajectory or rather the portion of the trajectory that passes through a no-block zone may be divided into a plurality of nodes and edges between pairs of nodes (e.g. between a source node and a target node), and a cost may be assessed for each edge within a no-block zone. For instance, the trajectory may be divided into a plurality of smaller distances, such as 2 meters or more or less, by "placing" a plurality of nodes or waypoints along the trajectory every 2 meters or more or less. Turning to FIG. 6, the no-block zone 510 is subdivided into 8 edges (here, edges A-J). Each of these edges starts and ends at a pair of nodes represented by circles. For example, edge A starts at node A1 and ends in node B1, edge B starts at node B1 and ends at node C1, and so on.

In some instances, the penetration cost may be combined with speed characteristics of the trajectory in order to determine a cost for an edge that traverses a no-block zone. In this regard, the cost for each edge of a trajectory that passes through a no-block zone, here $C_{edge1}$, may be determined using the following equation:

$$C_{edge1} = C_{penetration}(\text{target node position}) * I(\text{target node speed}) * \text{time length of edge}$$

In this example, the target node position represents the position of the autonomous vehicle along the trajectory when the rear of the autonomous vehicle reaches the target node of the edge. The time stopped at the starting node represents an amount of time that the autonomous vehicle is expected to be stopped at the starting node of the edge. Thus, if this is zero seconds, this component of the cost of the edge goes to zero. The value of I(edge speed) represents an indicator function, such that if the target node speed or speed of the autonomous vehicle along the edge is below a threshold this component of the cost of the edge goes to 1 and if the speed is at or above the threshold, this component of the cost of the edge goes to zero. This threshold can be a fixed, hand-tuned value, such as 1, 5, 10 miles per hour or more or less, or could be a function of the type of the no-block zone through which the edge traverses. For instance, the threshold value for a crosswalk may be lower than the threshold value for railroad tracks, as it may be more acceptable to spend more time traversing a no-block zone corresponding to a crosswalk than a no-block zone corresponding to a railroad track. In other words, the described approach would penalize slower speed through no-block zone for a railroad crossing. The time length of edge represents the amount of time the autonomous vehicle is expected to take to traverse the edge, for instance from the point in time when a rear or rear axle of the autonomous vehicle traverses the source node to the point in time when the rear of the autonomous is expected to reach the target node according to the trajectory (e.g. such that the autonomous vehicle has completely traversed the edge), according to the distance between the nodes and the velocity of the vehicle as defined by the trajectory.

The costs of the individual edges may be summed together. In this regard, returning to the example of FIG. 6, the costs of each of the edges A, B, C, D, E, F, G, H, I and J may be summed together to determine an aggregated cost. This aggregated cost may then be combined with other costs (including costs of any other no-block zones along the trajectory) and compared to other aggregated and/or combined costs of other trajectories in order to assess the overall cost of the trajectory and compared to other trajectories.

Alternatively, rather than separately assessing the components of cost based on the time the autonomous vehicle will be stopped and the time the autonomous vehicle will be below a certain threshold speed, a single smooth function, inversely correlated with speed may be used to capture both contributions to cost. In this regard, the cost for each edge of a trajectory that passes through a no-block zone, here $C_{edge2}$, may be determined using the following equation:

$$C_{edge2} = C_{penetration}(\text{target node position}) * C_{speed}(\text{target node state}) * \text{time length of edge}$$

Figure 7:
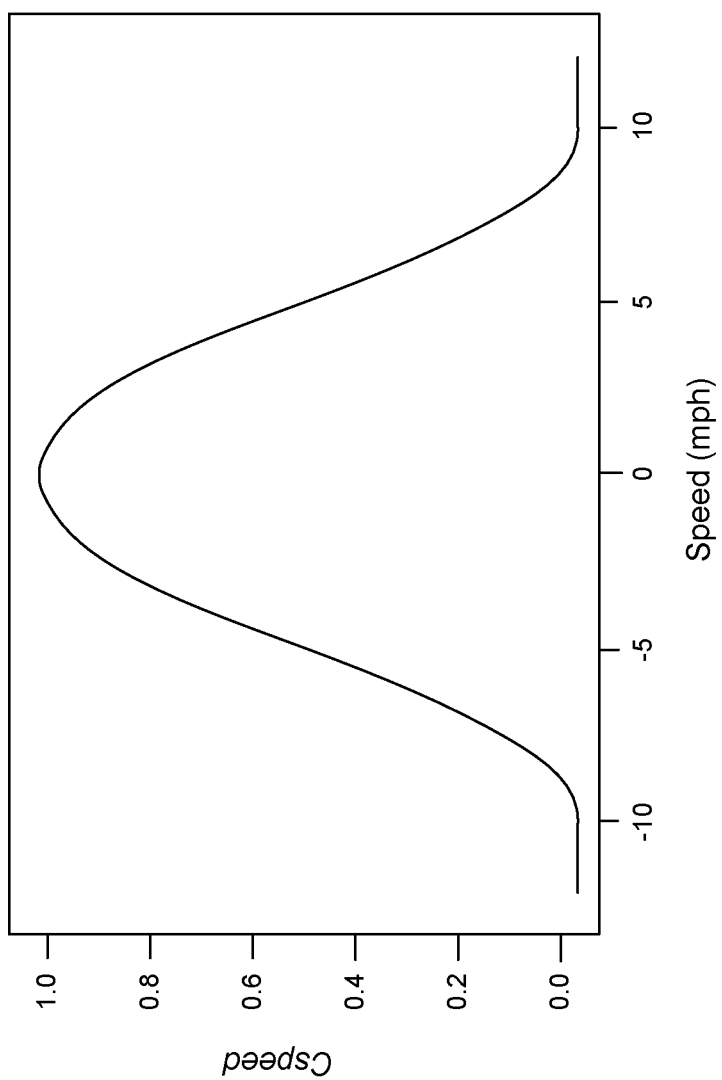
FIG. 7 is an example representation of a cost function in accordance with aspects of the disclosure.

In this example, the target node state represents the speed of the autonomous vehicle for the trajectory when the rear or rear axle of the vehicle traverses the target node for the edge (e.g. the autonomous vehicle has completely traversed the edge). The cost of an edge that traverses a no-block zone will be higher for lower speeds. In this regard, for speeds above a certain threshold, the cost should be zero so as to enable passing through the no-block zone. This can be captured using an indicator function $C_{speed}$ inversely correlated with speed. For example, the function $C_{speed}$ may be a sigmoid step function, or a linear or exponential equation. FIG. 7 is an example representation of a sigmoid step function with a threshold of 10 miles per hour which relates speed (in miles per hour) to representative costs according to the $C_{speed}$ function. In other instances, the shape of the function could depend on the type of the no-block zone, such as whether it's a stop sign intersection or traffic light intersection, or the vehicle's current driving environment, such as whether there is oncoming/crossing traffic.

Again, the costs of the individual edges may be summed together. In this regard, returning to the example of FIG. 6, the costs of each of the edges A, B, C, D, E, F, G, H, I and J may be summed together to determine an aggregated cost. This aggregated cost may then be combined with other costs (including costs of any other no-block zones along the trajectory) and compared to other aggregated and/or combined costs of other trajectories in order to assess the overall cost of the trajectory and compared to other trajectories.

In some instances, the cost of an edge may also take into account the hysteresis or the historical cost of an edge. This may be used to incentivize (e.g. lower the relative cost of) exiting a no-block zone more and more over time (across iterations). This can be implemented by having edges that leave the no-block zone yield a no-block cost of zero while edges that remain in the no-block zone have a higher cost. In this regard, the cost for each edge of a trajectory that passes through a no-block zone may be determined using one of the following equations:

$$C_{edge3} = C_{historical} + C_{edge1}$$

or $$C_{edge3} = C_{historical} + C_{edge2}$$

In this example, the historical cost, here $C_{historical}$, may be determined using the using the cost functions above (e.g. $C_{edge1}$ Or $C_{edge2}$) calculated for any portion of the "prior trajectory" (which may be the last generated or selected trajectory) within the no-block zone. In this regard, this may be a cost for a plurality of edges of the prior trajectory that pass through the no-block zone rather than just the current edge. In this regard, if the vehicle would not be in a no-block zone during the prior trajectory, this value would go to zero. In addition, the $C_{historical}$ can have a maximum value based on the type in order to prevent the cost from "blowing up" over time and dominating other higher priority costs that are used to evaluate each trajectory.

Again, the costs of the individual edges may be summed together. In this regard, returning to the example of FIG. 6, the costs of each of the edges A, B, C, D, E, F, G, H, I and J may be summed together to determine an aggregated cost. This aggregated cost may then be combined with other costs (including any costs of other no-block zones along the trajectory) and compared to other aggregated and/or combined costs of other trajectories in order to assess the overall cost of the trajectory and compared to other trajectories.

The features described herein may allow autonomous vehicles to avoid stopping or moving too slowly through no-block zones. In addition, the cost assessments described above may reduce the likelihood of an autonomous vehicle stopping within a no-block zone closer to the center of the no-block zone. As such, the vehicle may be more likely to stop closer to edges of the no block-zone rather than making unsafe maneuvers in order to avoid stopping within a no-block zone. In addition, because the features described herein penalize slower speeds through no-block zones, this may also cause autonomous vehicles to clear no-block regions even faster.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method controlling an autonomous vehicle, the method comprising:
generating, by one or more processors, a trajectory for the autonomous vehicle to traverse in order to follow a route to a destination;
identifying, by the one or more processors, a set of no-block zones through which the trajectory traverses, wherein a no-block zone is region where the autonomous vehicle should not stop but can drive through in an autonomous driving mode;
for each given no-block zone of the set, determining, by the one or more processors, a penetration cost such that the penetration cost increases towards a center of that given no-block zone and decreases towards edges of that given no-block zone;
determining, by the one or more processors, whether the autonomous vehicle should follow the trajectory based on the penetration cost; and
controlling, by the one or more processors, the autonomous vehicle in the autonomous driving mode according to the trajectory based on the determination of whether the autonomous vehicle should follow the trajectory.

2. The method of claim 1, wherein the penetration cost is determined further based on a type of the given no-block zone.

3. The method of claim 1, further comprising, aggregating the penetration costs for each no-block zone of the set, and wherein determining whether the autonomous vehicle should follow the trajectory is further based on the aggregated penetration costs.

4. The method of claim 1, further comprising:
generating a second trajectory the autonomous vehicle to traverse in order to follow the route;
identifying a second set of no-block zones through which the second trajectory traverses; and
for each given no-block zone of the second set, determining a second penetration cost such that the second penetration cost increases towards a center of that given no-block zone of the second set and decreases towards edges of that given no-block zone of the second set, wherein determining whether the autonomous vehicle should follow the trajectory is further based on the second penetration cost.

5. The method of claim 4, determining whether the autonomous vehicle should follow the trajectory further includes comparing the penetration cost to the second penetration cost.

6. The method of claim 4, further comprising:
aggregating the penetration costs for each no-block zone of the set; and aggregating the second penetration costs for each no-block zone of the second set, and wherein determining whether the autonomous vehicle should follow the trajectory further includes comparing the aggregated penetration costs and the aggregated second penetration costs.

7. The method of claim 1, wherein the trajectory includes the autonomous vehicle traversing one or more edges of a road graph, and the method further comprises determining a second cost for the trajectory based on the penetration cost and an expected speed of the autonomous vehicle while traversing an edge of the trajectory according to the trajectory, wherein the edge passes through at least one no-block region of the set, and wherein determining whether the autonomous vehicle should follow the trajectory is further based on the second cost.

8. The method of claim 7, wherein determining the second cost for the trajectory is further based on an expected amount of time for the autonomous vehicle to traverse the edge.

9. The method of claim 8, wherein traversing the edge involves the vehicle entering and completely exiting the edge.

10. The method of claim 7, wherein determining the second cost for the trajectory is further based on whether the expected speed of the autonomous vehicle while traversing the edge is greater than a threshold value.

11. The method of claim 10, further comprising, determining the threshold value based on a type of the no-block region through which the edge passes.

12. The method of claim 1, wherein the trajectory includes the autonomous vehicle traversing one or more edges of a road graph, and the method further comprises determining a second cost for the trajectory based on the penetration cost and an expected amount of time that the autonomous vehicle would be stopped at the start of an edge according to the trajectory.

13. A system for controlling an autonomous vehicle, the system comprising one or more processors configured to:
generate a trajectory for the autonomous vehicle to traverse in order to follow a route to a destination;
identify a set of no-block zones through which the trajectory traverses, wherein a no-block zone is region where the autonomous vehicle should not stop but can drive through in an autonomous driving mode;
for each given no-block zone of the set, determine a penetration cost such that the penetration cost increases towards a center of that given no-block zone and decreases towards edges of that given no-block zone;
determine whether the autonomous vehicle should follow the trajectory based on the penetration cost; and
control the autonomous vehicle in the autonomous driving mode according to the trajectory based on the determination of whether the autonomous vehicle should follow the trajectory.

14. The system of claim 13, wherein the penetration cost is determined further based on a type of the given no-block zone.

15. The system of claim 13, wherein the one or more processors are further configured to aggregate the penetration costs for each no-block zone of the set, and wherein the determining whether the autonomous vehicle should follow the trajectory is further based on the aggregated penetration costs.

16. The system of claim 13, wherein the one or more processors are further configured to:
generate a second trajectory the autonomous vehicle to traverse in order to follow the route;
identify a second set of no-block zones through which the second trajectory traverses; and
for each given no-block zone of the second set, determine a second penetration cost such that the second penetration cost increases towards a center of that given no-block zone of the second set and decreases towards edges of that given no-block zone of the second set, wherein determining whether the autonomous vehicle should follow the trajectory is further based on the second penetration cost.

17. The system of claim 13, wherein the trajectory includes the autonomous vehicle traversing one or more edges of a road graph, and the wherein the one or more processors are further configured to determine a second cost for the trajectory based on the penetration cost and an expected speed of the autonomous vehicle while traversing an edge of the trajectory according to the trajectory, wherein the edge passes through at least one no-block region of the set, and wherein determining whether the autonomous vehicle should follow the trajectory is further based on the second cost.

18. The system of claim 17, wherein the one or more processors are further configured to determine the second cost for the trajectory further based on an expected amount of time for the autonomous vehicle to traverse the edge.

19. The system of claim 17, wherein the one or more processors are further configured to determine the second cost for the trajectory further based on whether the expected speed of the autonomous vehicle while traversing the edge is greater than a threshold value.

20. The system of claim 13, wherein the trajectory includes the autonomous vehicle traversing one or more edges of a road graph, and wherein the one or more processors are further configured to determine a second cost for the trajectory based on the penetration cost and an expected amount of time that the autonomous vehicle would be stopped at the start of an edge according to the trajectory.

* * * * *